Figure 1:
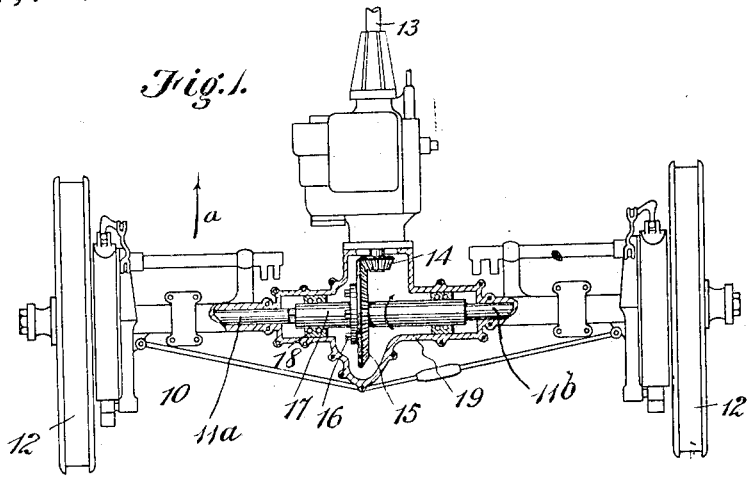

A. J. CARLTON.
DIFFERENTIAL DRIVING MECHANISM.
APPLICATION FILED MAY 22, 1914.

1,117,787.

Patented Nov. 17, 1914.

WITNESSES

INVENTOR
Alen James Carlton
BY
ATTORNEYS

UNITED STATES PATENT OFFICE.

ALEN JAMES CARLTON, OF FELLOWS, CALIFORNIA.

DIFFERENTIAL DRIVING MECHANISM.

1,117,787.  Specification of Letters Patent.  Patented Nov. 17, 1914.

Application filed May 22, 1914. Serial No. 840,222.

*To all whom it may concern:*

Be it known that I, ALEN J. CARLTON, a citizen of the United States, and a resident of Fellows, in the county of Kern and State of California, have invented a new and Improved Differential Driving Mechanism, of which the following is a full, clear, and exact description.

This invention relates to transmission devices for automobiles or the like, and has particular reference to a novel means serving the purpose of the usual differential gear mechanism associated usually with the driving axle of a vehicle.

Among the objects of the invention is to provide a mechanism of a simple, strong and reliable nature to be used as a substitute for the usual floating pinion differential mechanism.

The foregoing and other objects of the invention will hereinafter be more fully described and claimed and illustrated in the drawings forming a part of this specification in which like character of reference indicate corresponding parts in all the views, and in which—

Figure 2:
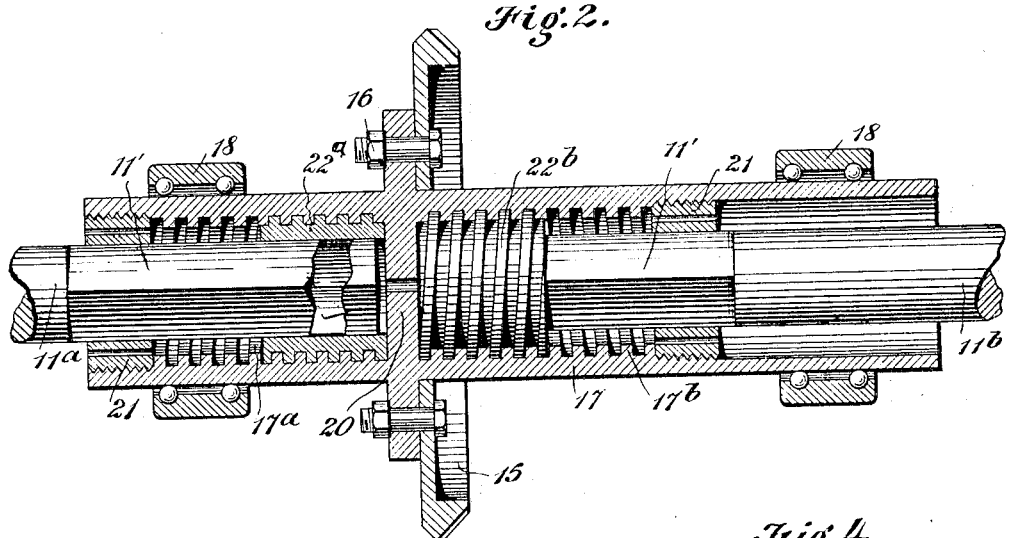
Figure 3:
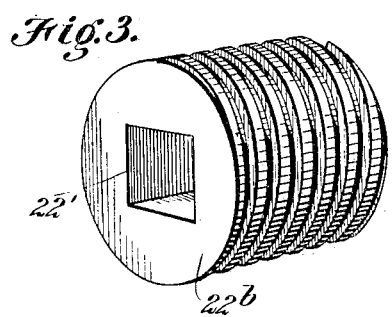
Figure 4:
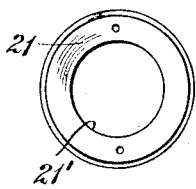

Figure 1 is a diagrammatic plan view of a fragment of the running gear of an automobile, showing the adaptation of my improvement thereto; Fig. 2 is a vertical longitudinal section of my differential mechanism on a larger scale than that shown in Fig. 1; Fig. 3 is a detail of one of the driving nuts; and Fig. 4 is a detail of one of the stop members.

The several parts of the device may be made of any suitable materials, and the relative sizes and proportions of the same, as well as the general design of the mechanism, may be varied to a considerable extent without departing from the spirit of the invention hereinafter more fully set forth and specifically claimed.

By way of illustration of the nature and use of my invention I show a portion of the running gear 10 of an automobile, including a driving axle 11 and driving wheels 12. This figure also shows a power shaft 13 having a pinion 14 meshing with a gear 15 connected rigidly in any suitable manner, as by means of bolts 16, to a driving sleeve 17.

As shown best in Fig. 2, said sleeve 17 extends laterally from both sides of the gear 15 and the ends of the sleeve loosely receive the adjacent ends of the two parts $11^a$ and $11^b$ of the driving axle. The frame of the machine is provided with any suitable bearings coöperating with the shafts $11^a$ and $11^b$ to prevent lateral displacement thereof or spreading of the wheels.

The sleeve 17 is supported in any suitable bearings, such as shown at 18, within the gear casing 19 to permit free rotation thereof due to the driving action of the power shaft acting through the pinion and gear 14 and 15 in either direction. The intermediate portion of the sleeve 17 is provided with an abutment 20 shown as a solid wall extending transversely of the axis of the sleeve, and on each side of the abutment 20 the sleeve is provided with right and left threads $17^a$ and $17^b$ respectively. The threads extend preferably from directly adjacent the abutment 20 outwardly to any desired extent toward the ends of the sleeve, the extent of such threads and the length of the sleeve depending upon the character of the machine with respect to the type of engine and transmission gearing employed. At the outer end of each threaded portion of the sleeve is secured a stop member in the form of a hollow nut 21 having a circular opening 21' therethrough. These stop members or nuts 21 may be secured in the sleeve by any suitable means as, for instance, by screw threads and are stationary with respect to the sleeve in operation. The length of the threads $17^a$ and $17^b$, and hence the distance between the abutment 20 and each stop member, are substantially equal.

At $22^a$ and $22^b$ I show a pair of driving nuts having right and left threads respectively coöperating with the aforesaid threads $17^a$ and $17^b$, and hence movable longitudinally of the sleeve between the abutment and the stop members 21. Each of the driving nuts has driving connection with one of the shaft members, but is freely slidable thereon within the limits prescribed by said abutment and stop members. The driving connection between the nuts and the shafts shown herein, and which I have found suitable, comprises a polygonal section of each shaft member as shown at 11', the same coöperating with a square axial hole 22' through each of the nuts.

With the mechanism made as herein set forth, the operation may be briefly set forth as follows: With the engine running for the purpose of driving the machine in the direction indicated by the arrow $a$, Fig. 1, the position of the parts will be as indicated in Fig. 2, with the driving nuts abutting squarely against the abutment 20, the rotation of the gear 15 and sleeve 17 causing the nuts to assume the position just stated. With the nuts bearing against the abutment and held for rotation with the sleeve and driving gear, they will cause corresponding rotation of the shafts 11ª and 11ᵇ and wheels 12 connected thereto at the same angular velocity. Should, however, one of the wheels tend to describe a larger radius than the other in making a curve or for any other reason rotate faster than the other being positively driven, the shaft of such wheel acting through the square portion 11′ thereof will cause the driving nut engaging therewith to rotate within the sleeve and thereby move outwardly toward the stop nut 21. In other words, the driving nuts are adapted to play more or less freely along the polygonal portions of the shafts anywhere between the abutment 20 and several stop members 21, according to the tendency of one of the driving wheels to rotate at a different speed from the other for any reason. In the operation of the motor in the reverse direction, the nuts 22ª and 22ᵇ will be carried directly into engagement with the stop members 21, and when they engage such members the rotation of the gear and sleeve will drive the axle and wheels in a manner similar to that above described. In this connection, then, the tendency of one wheel to rotate faster than the other will be permitted by the nut pertaining to such wheel advancing inwardly toward the abutment.

Having thus described my invention, I claim as new and desire to secure by Letters Patent:

1. In a differential driving mechanism of the character set forth, the combination of a pair of axially alined shafts, a sleeve embracing the adjacent ends of the shafts, said sleeve being provided intermediate its ends with an abutment and having right and left threads on opposite sides of the abutment, a pair of driving nuts on opposite sides of the abutment meshing with said threads respectively, said nuts having driving connection with said shafts and movable longitudinally thereof, and means to rotate the sleeve.

2. In a differential driving mechanism of the character set forth, the combination of a pair of axially alined shafts, a sleeve embracing the adjacent ends of the shafts, said sleeve being provided intermediate its ends with an abutment and having right and left threads on opposite sides of the abutment, a pair of driving nuts on opposite sides of the abutment meshing with said threads respectively, said nuts having driving connection with said shafts and movable longitudinally thereof, stop members secured to said sleeve on opposite sides of and equally spaced from said abutment to limit the longitudinal movement of the nuts along the shafts, and means to rotate the sleeve.

In testimony whereof I have signed my name to this specification in the presence of two subscribing witnesses.

ALEN JAMES CARLTON.

Witnesses:
CHARLES DEL BONDIO,
A. E. DAMON.